MEANS FOR STABILIZING TELEVISION DEFLECTION CIRCUITS
Filed April 12, 1965
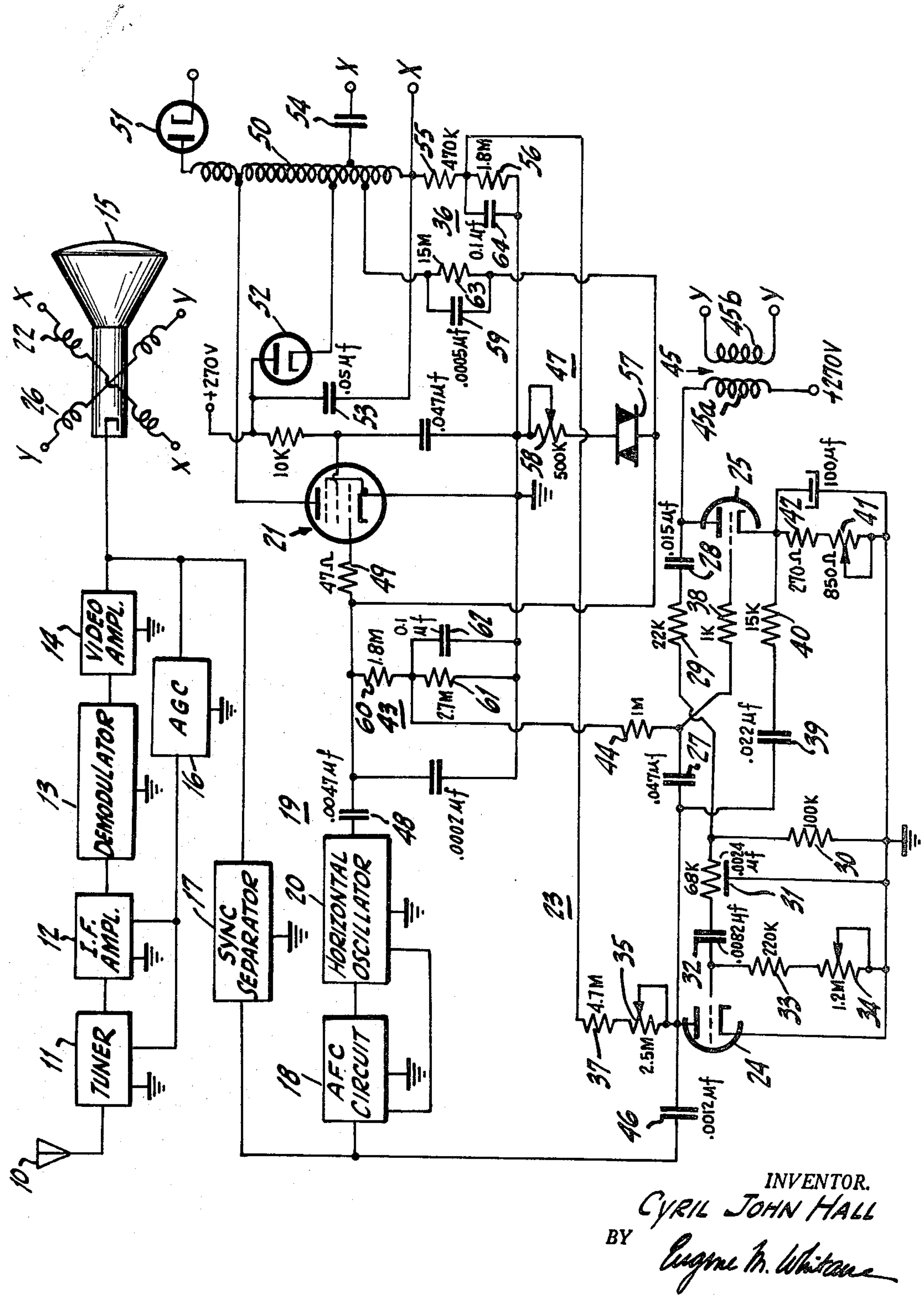
INVENTOR.
CYRIL JOHN HALL
BY Eugene M. Whitacre
Attorney United States Patent Office 3,417,28
Patented Dec. 17, 196

3,417,282
MEANS FOR STABILIZING TELEVISION DEFLECTION CIRCUITS

Cyril John Hall, Horgen, Switzerland, assignor to Radio Corporation of America, a corporation of Delaware
Filed Apr. 12, 1965, Ser. No. 447,144
6 Claims. (Cl. 315—24)

ABSTRACT OF THE DISCLOSURE

Television deflection circuits are stabilized against variations in width, height and linearity resulting from line voltage variations. A voltage dependent resistor (VDR) is coupled in circuit with the horizontal flyback winding to develop a compensating voltage which is applied to the input of the horizontal output stage so as to maintain image width constant as line voltage varies. A portion of the compensating voltage is applied to the input of the vertical output stage to maintain substantially constant average output current. Furthermore, a portion of the B boost voltage is supplied to the output of the vertical oscillator setage so as to maintain the peak-to-peak output current of the vertical output stage substantially constant as line voltage varies.

This invention relates to television receiver circuits, and more particularly, to means for stabilizing the deflection circuits of a television receiver against variations of power line voltage, aging of components and other circuit variations.

In a television receiver, images are produced on the screen of a cathode ray tube by scanning an electron beam in a regular pattern across the screen and simultaneously varying the electron beam current according to variations in the brightness of the image which is to be reproduced. In general, commercial television receivers utilized electromagnetic deflection means for scanning the electron beam over the screen of the cathode ray tube in both the horizontal and vertical directions. In many present day commercial television receivers, energy is supplied to the electromagnetic deflection means from a self-oscillating circuit, the typical circuit having an oscillator stage and an amplifier or output stage coupled thereto.

In deflection circuits of the above-described type, variations of power line voltage result in variations in the amplitude of deflection signals produced by such circuits and therefore cause changes in the height or width, as the case may be, of the image produced on the screen of the cathode ray tube. Heretofore, it has been recognized that it is advantageous either to stabilize the voltages supplied to such circuits or to provide compensating means within the circuits to counteract the effect of power line voltage variations.

In certain prior vertical deflection circuits, stabilization has been accomplished by providing negative feedback between the output and input electrodes of the vertical output stage to stabilize the gain of this stage and further by providing a regulating means for the supply voltage of the vertical oscillator stage. Regulation of the vertical oscillator stage supply voltage insures that the driving signal applied to the vertical output stage is of a substantially constant amplitude and has been achieved, for example, by including a voltage dependent resistor (VDR) in the vertical oscillator plate supply circuit. The above-described design technique for stabilization of a vertical deflection circuit has proven satisfactory in television receivers in which a pentode tube is utilized for the vertical output stage. However, for reasons of economy, a triode tube is often preferred over a pentode in the vertical output stage since the co of the triode is less or, in more practical terms, the co of the double triode in a single envelope fulfilling tl functions of vertical oscillator and vertical output stag is less than the cost of an equivalent combinatio triode-pentode for the same functions. In addition, th use of the triode output stage avoids the need for scree grid decoupling components thereby achieving a furthe economy relative to the pentode output circuit. Th technique for stabilizing vertical deflection circuits ou lined above and frequently used with pentode outpu tubes is less satisfactory when employed with triod tubes because of the relatively lower amplification facto which is commonly found in triodes used for vertic deflection. Since the amplification factor of the triode i relatively low, the magnitude of negative feedback th can be applied is substantially lower than that in pentode circuit. As a consequence, the stabilizing effec is substantially reduced.

In accordance with the present invention means ar provided for stabilizing the deflection circuits of a tele vision receiver whereby negative feedback is not require in the output stage. Furthermore, a separate VDR is nc required for stabilization of the supply voltage of th vertical oscillator. A circuit constructed in accordanc with the present invention requires fewer component than the prior circuits described above and furthermor may be used, for example, with either triode or pentod type vertical output tubes. Use of the present inventio in connection with a triode output tube is particularl advantageous since, in that case, few additional compo nents are required making the overall circuit compatibl with the basic economy of the triode or other simila electronic device.

While the several aspects of the invention may be em ployed in a number of different applications, the inven tion is particularly useful in connection with stabiliza tion of a vertical deflection circuit in a television receiver Therefore, the invention will be described in such a cir cuit.

The present invention is characterized in that tw means are employed to counteract the changes of imag height and vertical linearity caused by power line volt age or other circuit variations. First, the input bias applie to the vertical output stage is caused to vary with powe line voltage variations in such a manner as to maintai substantially constant the average or D.C. output curren in the output stage. Second, the drive waveform applie from the vertical oscillator to the input of the vertica output stage is caused to vary in amplitude with powe line voltage variations in such a manner that the peak to-peak excursions of the waveform produced by th output stage are maintained substantially constant. Th proportions in which the input bias and the drive wave form are caused to vary with power line voltage varia tions are controlled in a predetermined manner by suit able choice of circuit component values so that variation of image height and vertical linearity are reduced to a minimum. The above results are achieved economicall with very few additional components by suitably inter connecting the vertical deflection circuit and portions of the horizontal deflection circuit, the latter utilizing a stabilization technique characterized by the incorporation of a voltage dependent resistor in circuit with the horizontal output stage.

The novel features that are considered characteristic of this invention are set forth with particularity in the appended claims. The invention itself, however, both as to its organization and method of operation, as well as objects and advantages thereof, will best be understood from the following description when read in connection with the accompanying drawing, in which the sole figure ıematic circuit diagram, partially in block diagram ɔf the image reproducing portion of a television r having horizontal and vertical deflection cir- abilized in accordance with the present invention.

rring to the drawing, the television receiver in- an antenna 10 for receiving composite television and for coupling such signals to a television : tuner 11. The tuner 11 normally includes one e radio frequency (R-F) amplifier stages tunable urality of frequencies coresponding to television ıst carrier signals and a frequency converter for ing radio frequency signals into intermediate fre- (I-F) signals. The receiver further includes an diate frequency amplifier 12 and a demodulator latter serving to derive composite television video from the intermediate frequency signals. A video ɛr 14 coupled to the output of demodulator 13 ; amplified composite video television signals rep- tive of an image to be displayed to a control le of a television kinescope 15. The output of mplifier 14 also is coupled to an AGC circuit 16, ɛer in turn being coupled to the R-F amplifier n tuner 11 and to the I-F amplifier 12 to control n thereof in accordance with the amplitude of 1 signals and thereby to maintain the output of ımplifier 14 substantially constant over a wide f input signal levels. The amplified composite video ɔn signals are also coupled from video amplifier ı synchronizing signal separator circuit 17. Sync ɔr circuit 17 separates the horizontal and vertical ɔn synchronizing signals from the remainder of ıposite video signal. The separated horizontal syn- ing pulses are applied from sync separator cir- ; by means of a suitable time constant circuit (not , to an automatic frequency control (AFC) cir- AFC circuit 18 is coupled to a horizontal deflec- ɪveform generating circuit 19 which includes a tal oscillator 20 and a horizontal output stage 21. tput terminals X—X of horizontal output stage coupled, as will be explained more fully below, similarly labelled terminals X—X of a horizontal ɔn winding 22 associated with kinescope 15.

cal synchronizing pulses are supplied from sync ɔr circuit 17 by means of an additional time t network (not shown) to a vertical deflection rm generating circuit 23 which includes a vertical ɔr stage 24 and a vertical output stage 25. The terminals Y—Y of vertical output stage 25 are [ to the similarly labelled terminals Y—Y of a deflection winding 26 associated with kinescope 15. portions of the horizontal and vertical deflection 19 and 23 which embody the present invention l be described in further detail.

cal oscillator 24 and vertical output stage 25 constructed, for example, utilizing the two sec- ' a double triode such as RCA Type 13GF7. As is ıry in circuits of this type, oscillator 24 produces :itor 27 a substantially sawtooth voltage waveform. vtooth voltage is coupled by means of capacitor he control grid of output stage 25. Oscillations intained in the circuit by positive feedback from :e of output stage 25 to the grid of oscillator 24 ɔulse shaping network comprising capacitor 28, 29, resistor 30, feed-through capacitor 31, capaci- resistor 33 and variable resistor 34. Resistor 34 ıs a vertical "hold" control and is adjustable to setting of the frequency of oscillation to a desired After initial adjustment of resistor 34, the fre- of oscillation is maintained by means of vertical nizing pulses supplied from synchronizing signal ɔr circuit 17 to the grid of output stage 25 via ɔrs 46 and 27. The amplitude of the sawtooth oltage supplied by oscillator 24 may be adjusted ns of a variable height control resistor 35 which led to the plate electrode of oscillator 24. The drive voltage amplitude is further dependent upon the plate supply voltage provided for oscillator 24, the plate supply voltage being derived from a voltage divider circuit 36 coupled to the "B boost" supply in horizontal deflection circuit 19. A relatively large charging resistor 37 is coupled in the charging path of capacitor 27 between height control resistor 35 and voltage divider 36.

The shape of the sawtooth drive waveform supplied by oscillator 24 is dependent upon the values chosen for capacitor 27, resistor 38, capacitor 39 and resistor 40, as well as upon the values of divider 36 and resistors 35 and 37.

The shape and amplitude of the plate current produced in output stage 25 are dependent upon the shape and amplitude of the sawtooth drive voltage supplied by oscillator 24 (which may be controlled as explained above) and furthermore, are dependent upon the operating conditions and characteristics of the particular discharge device (e.g. triode) utilized in output stage 25.

The operating conditions (i.e. grid to cathode bias) of output stage 25 may be adjusted by means of a variable linearity control resistor 41 coupled in series with a fixed resistor 42 in the cathode circuit of output stage 25. The operating conditions of output stage 25 are further dependent upon the magnitude of a negative grid control voltage supplied from a voltage divider circuit 43 associated with the control grid circuit of horizontal output stage 21. The negative grid control voltage is supplied to the grid of vertical output stage 25 by means of a resistor 44.

The plate electrode of output stage 25 is coupled to a positive voltage supply (+270 v.) by means of the primary winding 45*a* of an output transformer 45.

The plate current variations which are produced in output stage 25 as a result of the sawtooth drive voltage applied to the grid thereof flow through the primary winding 45*a* to produce in secondary winding 45*b* the required sawtooth deflection current waveform for application to vertical deflection winding 26 via terminals Y—Y.

The plate supply voltage applied to vertical oscillator 24 and the negative grid control voltage applied to vertical output stage 25 are derived, in accordance with the present invention, from a horizontal deflection circuit 19 which includes a compensating means, indicated generally by the reference numeral 47, responsive to power line voltage variations.

In horizontal deflection circuit 19, a substantially sawtooth voltage recurring at the horizontal scanning frequency is produced by horizontal oscillator 20 and applied via a capacitor 48 and a resistor 49 to the first control grid of a pentode type horizontal output stage 21 such as RCA Type 17JB6. Associated with the horizontal output stage 21 in a conventional manner, is a multi-sectioned output transformer 50 to which are coupled a high voltage rectifier 51, a damper diode 52, and a boost capacitor 53 one terminal of capacitor 53 and the plate electrode of diode 52 being coupled together to a B+ voltage supply (+270 v.). The output terminals X—X associated with horizontal deflection winding 22 are coupled by means of a D-C blocking capacitor 54 across a section of transformer 50.

The voltage divider 36, which includes first and second series connected resistors 55 and 56 and a filter capacitor 64 coupled across resistor 56, is coupled between the "B-boost" terminal of transformer 50 and ground. Voltage divided 36 is arranged to provide a predetermined portion of the B boost voltage to the plate of vertical oscillator 24.

The compensating means 47, which includes a voltage dependent resistor (VDR) 57, a variable resistor 58 coupled between VDR 57 and ground, a capacitor 59 for A-C coupling VDR 57 to transformer 50, and a resistor 63 coupled across capacitor 59 for D-C coupling VDR 57 to transformer 50, provide a varying negative bias voltage to the first control grid of horizontal output stage 21.

Voltage divider 43, which includes first and second series connected resistors 60 and 61 and a filter capacitor 62 coupled across resistor 61, is coupled between the first control grid and the cathode of horizontal output stage 21 and supplies to the grid of vertical output stage 25 via resistor 44 a variable negative grid control voltage proportional to the voltage supplied by compensating means 47 to the first control grid of horizontal output stage 21.

In the operation of the horizontal deflection circuit 19, the deflection waveform produced across transformer 50 is characterized by a relatively short duration, positive polarity, high voltage pulse occurring during the retrace portion of each horizontal deflection cycle. The amplitude of this retrace pulse is dependent upon the amplitude of the deflection current which flows through transformer 50 during the trace portion of a deflection cycle, the trace current amplitude being determinative of the size (i.e. width) of the image produced on kinescope 15 and furthermore being dependent, at least in part, upon the positive supply voltage applied to the plate of horizontal output tube 21. The positive plate supply voltage, in turn, is dependent upon the power line voltage supplied to the television receiver. Variations in power line voltage normally are directly reflected in the amplitude of the horizontal retrace pulse by means of the casual chain outline above. Furthermore, the amplitude of the horizontal retrace pulse changes in the same sense as the power line voltage. The compensating means 47 is responsive to changes in amplitude of the horizontal retrace pulse for varying the operating characteristics (e.g. grid bias) of horizontal output tube 21 so as to substantially reduce variations in image width. In compensating means 47, VDR 57 exhibits a relatively low resistance when subjected to a high voltage and exhibits a relatively high resistance when subjected to a low voltage. VDR 57 in conjunction with capacitor 59 serves to rectify the positive polarity relatively high voltage retrace pulses and to develop a negative bias voltage dependent upon the amplitude of such pulses. Specifically VDR 57 presents a relatively low resistance charging path for capacitor 59 during each positive retrace pulse and presents a high resistance path during the remainder of each scanning cycle. Capacitor 59 therefore is charged rapidly during retrace so as to provide at the first control grid of horizontal output stage 21 a negative bias voltage dependent upon the amplitude of retrace pulses. For example, decrease in power line voltage results in a decrease in the amplitude of retrace pulses which, in turn, results in production of a less negative voltage at capacitor 59. The resulting decrease in grid bias applied to horizontal output stage 21 causes the gain of stage 21 to increase, thereby varying the output current produced by output stage 21 so as to compensate for the reduction in the image width which otherwise would occur.

An opposite compensating action occurs upon an increase in power line voltage. Image width is therefore substantially stabilized despite variations in power line voltage.

The negative grid control voltage developed by compensating means 47 also appears across voltage divider circuit 43. A portion of this control voltage is applied via resistor 44 to the grid of vertical output stage 25. Vertical output stage 25 is supplied at its plate electrode with a positive voltage (B+) which, as was pointed out above, varies in the same sense as the power line voltage. The portion of the negative grid control voltage developed at voltage divider 43 which is applied to vertical output stage 25 is selected such that the average or D-C plate current of vertical output stage 25 is maintained substantially constant upon variations in power line voltage. For example, if the power line voltage decreases, the plate supply voltage applied to vertical output stage 25 also decreases and, in accordance with the invention, the volta applied to the grid of output stage 25 becomes sufficien less negative, by virtue of the action of compensati means 47 and the ratio of resistors 60 and 61 to mainta the average plate current of output stage 25 substantia constant. The proportioning of the resistors 60 and 61 dependent upon the operating conditions and type of c vices utilized in the circuit. Illustrative component valu are shown on the drawing for one typical configuratic The maintenance of a substantially constant avera plate current in vertical output stage 25 serves to preve a degradation in vertical linearity and furthermore, ten to counteract the change which otherwise would occur image height. However, the condition of substantially co stant plate current in vertical output stage 25 is not suf cient in itself to provide constant image height and linea ity. In addition, it is necessary that the amplitude of t sawtooth drive voltage produced by vertical oscillator vary in a controlled manner. The required variation of t vertical sawtooth drive voltage is obtained by coupling the plate electrode of vertical oscillator 24 a portion the B boost voltage developed in the horizontal deflectic circuit 19. The B boost voltage, derived in the well know manner from a combination of B+ and an addition voltage dependent upon the amplitude of horizontal r trace pulses, reflects changes in power line voltage. T ratio of resistors 55 and 56 in voltage divider 36 is s lected such that the drive voltage waveform applied to t grid of vertical output stage 25 varies in amplitude wi power line voltage variations in such a way that the pea to-peak plate current excursions of vertical output sta 25 remain substantially constant despite line voltage va ations. For example, if line voltage decreases, as note above, the negative grid voltage applied to vertical ou put stage 25 is decreased in a compensating manner b the action of compensating means 47. The decrease in gr voltage in addition to maintaining the average output cu rent in stage 25 substantially constant, causes the gain the output stage to increase. If the peak-to-peak excursic of the input to output stage 25 remained constant, the i crease in gain would result in a larger output from sta 25. Therefore, in accordance with the invention the pla voltage applied to oscillator 24 is arranged to decrea as line voltage decreases, thereby causing the peak-to-pea input to output stage 25 to decrease under such condition The increase in gain of output stage 25 and decrease i input to output stage 25 are controlled such that th peak-to-peak excursions of the output current of outp stage 25 remains substantially constant.

In a similar manner, any increase in power line volta which tends to increase image height is counteracted b the circuits so as to maintain image height substantiall constant.

What is claimed is:

1. In a television receiver having a cathode ray imag reproducing tube and an electromagnetic deflection yok including horizontal and vertical deflection windings fc scanning an electron beam over the face of said tube in regular scanning pattern, the combination comprising:

horizontal deflection means including a horizontal ou put amplifier for developing a horizontal scannin waveform, the waveform including relatively hig voltage retrace pulses, compensating means responsive to said retrace pulse for developing a direct control voltage having an am plitude dependent upon the amplitude of said retrac pulses, means for applying said direct control voltage to sai horizontal output amplifier to vary the amplitude c said horizontal scanning waveform so as to maintai the width of said scanning pattern substantially cor stant, the combination further comprising vertical deflectio means including a vertical oscillator and a vertic tput amplifier for developing a vertical scanning ıveform, and ıs coupled between said compensating means and d vertical output amplifier for applying to said ver- al output amplifier a predetermined portion of said ·ect control voltage, the portion being selected to ıintain the average output current in said vertical tput amplifier substantially constant.

. a television receiver having a cathode ray image ıcing tube and an electromagnetic deflection yoke ıg horizontal and vertical deflection windings for g an electron beam over the face of said tube in ar scanning pattern, the combination comprising:

:ontal deflection means including a horizontal out- t amplifier for developing a horizontal scanning .veform, the waveform including relatively high ltage retrace pulses, horizontal deflection means further including ːans for developing from said retrace pulses a osted supply voltage, ıensating means responsive to said retrace pulses · developing a direct control voltage having an ıplitude dependent upon the amplitude of said race pulses, ıs for applying said direct control voltage to said rizontal output amplifier to vary the amplitude of d horizontal scanning waveform so as to maintain : width of said scanning pattern substantially nstant, ombination further comprising vertical deflection ːans including a vertical oscillator and a vertical tput amplifier for developing a vertical scanning veform, .s coupled between said compensating means and d vertical output amplifier for applying to said ·tical output amplifier a predetermined portion of d direct control voltage, the portion being selected maintain the average output current in said verti- output amplifier substantially constant, and s coupled between said boosted supply voltage ·eloping means and said vertical oscillator for ɔlying to said vertical oscillator a predetermined :tion of said boosted supply voltage, the last- ned portion being selected to maintain substan- lly constant the peak-to-peak excursions of the tput current produced by said vertical output .plifier.

a television receiver having a cathode ray image cing tube and an electromagnetic deflection yoke ıg horizontal and vertical deflection windings for g an electron beam over the face of said tube ular scanning pattern, the television receiver being d with a supply voltage which is subject to unde- fluctuations, the combination comprising:

ontal deflection means including a horizontal out- : amplifier for developing a horizontal scanning veform, the waveform including relatively high .tage retrace pulses which vary in amplitude upon :tuation in said supply voltage, ensating means responsive to said retrace pulses developing a direct control voltage having an am- :ude dependent upon the amplitude of said retrace ses, s for applying said direct control voltage to said :izontal output amplifier to vary the amplitude of d horizontal scanning waveform so as to maintain width of said scanning pattern substantially con- nt despite fluctuations in said supply voltage, horizontal deflection means further including ans for developing from said retrace pulses a ɔsted supply voltage, ombination further comprising vertical deflection ans including a vertical oscillator and a vertical :put amplifier for developing a vertical scanning veform, means coupled between said compensating means and said vertical output amplifier for applying to said vertical output amplifier a predetermined portion of said direct control voltage, the portion being selected to maintain the average output current in said vertical output amplifier substantially constant despite fluctuations in said supply voltage, and means coupled between said boosted supply voltage developing means and said vertical oscillator for applying to said vertical oscillator a predetermined portion of said boosted supply voltage, the last-named portion being selected to maintain substantially constant the peak-to-peak excursions of the output current produced by said vertical output amplifier despite fluctuations in said supply voltage.

4. In a television receiver having a cathode ray image reproducing tube and an electromagnetic deflection yoke including horizontal and vertical deflection windings for scanning an electron beam over the face of said tube in a regular scanning pattern, the combination comprising:

horizontal deflection means including a horizontal output amplifier for developing a horizontal scanning waveform, a horizontal output transformer across which said waveform is developed coupled to said amplifier, the waveform including relatively high voltage retrace pulses, rectifier means coupled to said transformer for developing from said retrace pulses a boosted supply voltage, compensating means responsive to said retrace pulses for developing a direct control voltage having an amplitude dependent upon the amplitude of said retrace voltage pulses, means for applying said direct control voltage to the input of said horizontal output amplifier to vary the amplitude of said horizontal scanning waveform so as to maintain the width of said scanning pattern substantially constant, the combination further comprising vertical deflection means including a vertical oscillator and a vertical output amplifier for developing a vertical scanning waveform, and means coupled between said compensating means and said vertical output amplifier for applying to said vertical output amplifier a predetermined portion of said direct control voltage, the portion being selected to maintain the average output current in said vertical output amplifier substantially constant, and means coupled between said rectifier means and said vertical oscillator for applying to said vertical oscillator a predetermined portion of said boosted supply voltage, the last-named portion being selected to maintain substantially constant the peak-to-peak excursions of the output current produced by said vertical output amplifier.

5. In a television receiver having a cathode ray image reproducing tube and an electromagnetic deflection yoke for said tube including horizontal and vertical deflection windings for scanning an electron beam over the face of said tube in a regular scanning pattern, the combination comprising:

horizontal deflection means including a horizontal output amplifier for developing a horizontal scanning waveform, a horizontal output transformer across which said waveform is developed coupled to said amplifier, the waveform including relatively high voltage retrace pulses, rectifier means coupled to said transformer for developing from said retrace pulses a boosted supply voltage, compensating means including a voltage dependent resistor and a capacitor coupled in circuit with at least a portion of said output transformer and responsive to said retrace pulses for developing a direct control voltage having an amplitude dependent upon the amplitude of said retrace pulses, means for applying said direct control voltage to said horizontal output amplifier to vary the gain thereof and thereby vary the amplitude of said horizontal scanning waveform so as to maintain the width of said scanning pattern substantially constant, the combination further comprising vertical deflection means including a vertical oscillator and a vertical output amplifier for developing a vertical scanning waveform, means coupled between said compensating means and said vertical output amplifier for applying to said vertical output amplifier a predetermined portion of said direct control voltage, the portion being selected to maintain the average output current in said vertical output amplifier substantially constant, and means coupled between said rectifier means and said vertical oscillator for applying to said vertical oscillator a predetermined portion of said boosted supply voltage, the last-named portion being selected to maintain substantially constant the peak-to-peak excursions of the output current produced by said vertical output amplifier.

6. In a television receiver having a cathode ray image reproducing tube and an electromagnetic deflection yoke including horizontal and vertical deflection windings for scanning an electron beam over the face of said tube in a regular scanning pattern, the television receiver being provided with a supply voltage which is subject to undesirable fluctuations, the combination comprising:

horizontal deflection means including a horizontal output amplifier for developing a horizontal scanning waveform, a horizontal output transformer across which said waveform is developed coupled to said amplifier, the waveform including relatively high voltage retrace pulses which vary in amplitude upon fluctuation in said supply voltage, compensating means including a voltage dependent resistor and a capacitor coupled in circuit with said output transformer responsive to said retrace pulses for developing a direct control voltage having an amplitude dependent upon the amplitude of said retr pulses, means for applying said direct control voltage to s horizontal output amplifier to vary the gain ther and thereby vary the amplitude of said horizor scanning waveform so as to maintain the width said scanning pattern substantially constant desp fluctuations in said supply voltage, the combination further comprising rectifier means co pled to said transformer for developing from said trace pulses a boosted supply voltage, vertical deflection means including a vertical oscilla and a vertical output amplifier for developing a v tical scanning waveform, means coupled between said compensating means a said vertical output amplifier for applying to s vertical output amplifier a predetermined portion said direct control voltage, the portion being select to maintain the average output current in said v tical output amplifier substantially constant desp fluctuations in said supply voltage, and means coupled between said rectifier means a said vertical oscillator for applying to said vertic oscillator a predetermined portion of said boost supply voltage, the last-named portion being select with respect to the selected portion of said direct co trol voltage applied to said vertical output amplifi to maintain substantially constant the peak-to-pe excursions of the output current produced by sa vertical output amplifier despite fluctuations in sa supply voltage.

References Cited

UNITED STATES PATENTS 2,543,304 2/1951 Schwarz ............ 315—

RODNEY D. BENNETT, *Primary Examiner.*

T. H. TUBBESING, *Assistant Examiner.*

U.S. Cl. X.R.

315—27